May 14, 1940.   S. G. JOHNSON   2,200,885
THREAD GAUGE
Filed June 6, 1938
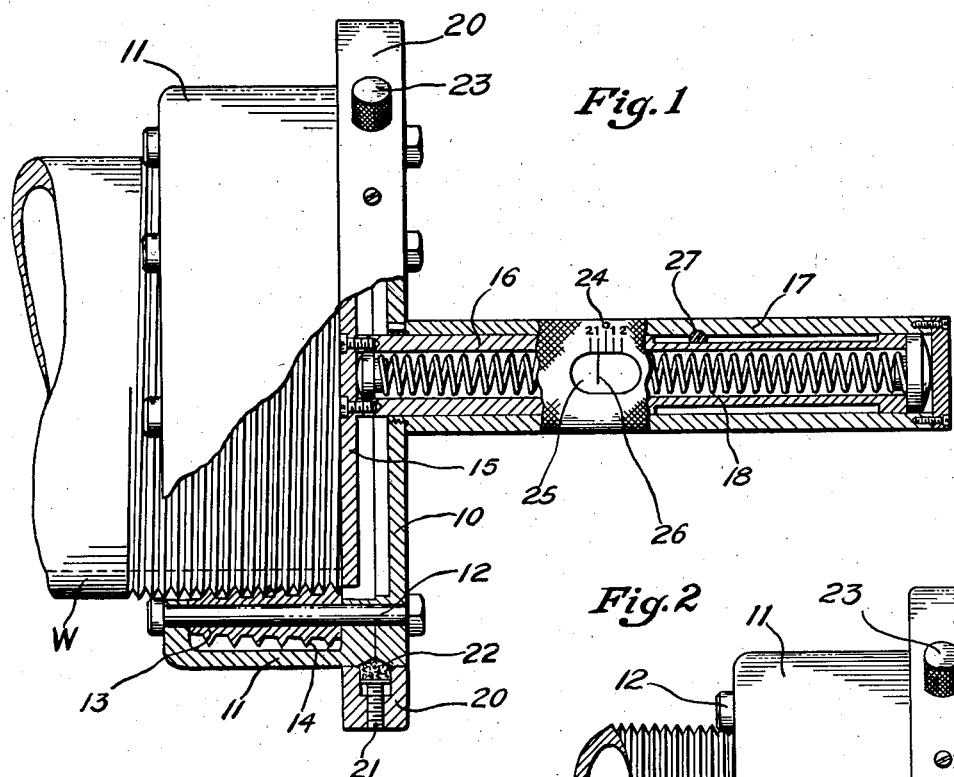
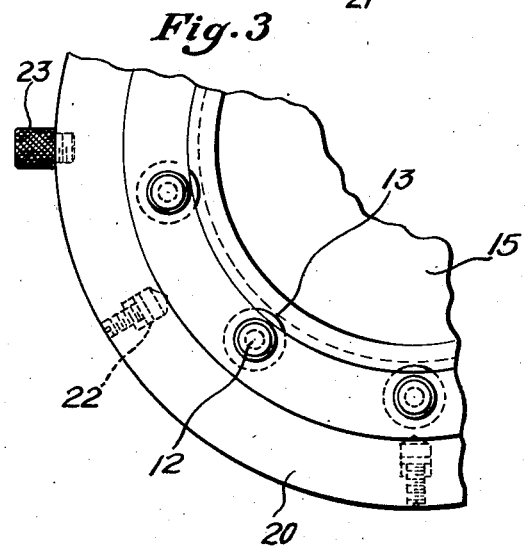
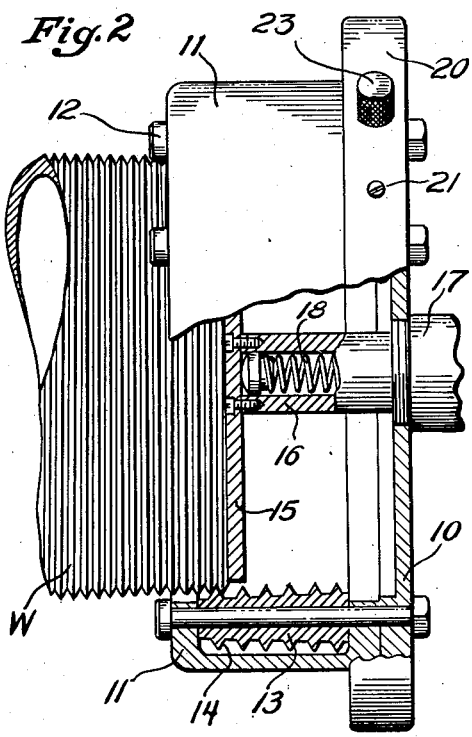
INVENTOR.
S. G. Johnson
BY Joseph N. Schofield
ATTORNEY Patented May 14, 1940

2,200,885

UNITED STATES PATENT OFFICE 2,200,885

THREAD GAUGE

Stanley G. Johnson, Hartford, Conn., assignor to Niles-Bement-Pond Company, Hartford, Conn., a corporation of New Jersey Application June 6, 1938, Serial No. 212,024

2 Claims. (Cl. 33—199)

This invention relates to screw thread gauges and more particularly to gauges for tapered screw threads upon the ends of pipes, tubes, etc.

An object of primary importance is to facilitate the initial engagement of screw threads being gauged with the gauging elements.

Another object of the invention is to provide a gauge having a plurality of grooved members spaced in a circular series and mounted for free rotation, portions of these rollers engaging the screw threads being gauged, and there being a plate mounted in the holding member for these gauging members adapted to engage against the end face of the member the threads of which are being gauged, this plate being movable within the gauge in a direction coaxial with the threads being gauged and normally forced toward the initial thread engaging position.

Another object of the invention is to make use of the movable plate to indicate variations in sizes of the threaded members being gauged.

And finally it is an object of the invention to provide a convenient, compact thread gauge which will enable the threaded ends of pipes and other members to be accurately and quickly gauged, the device being adaptable either for screw threads of tapered or straight form and having any sectional form.

With the above and other objects in view the invention may consist in the features of construction and operation set forth in the following specification and illustrated in the accompanying drawing.

In the acompanying drawing annexed hereto and forming a part of this specification, I have shown the invention embodied in a thread gauge for a pipe or tube having the usual tapered screw threads upon one end, but it will be understood that the invention can be otherwise embodied and that the drawing is not to be construed as defining or limiting the scope of the invention, the claims appended to this specification being relied upon for that purpose.

In the drawing:

Figure 1 is a side elevation, partly in cross section, showing a complete gauge in operative position upon a pipe and with the gauge fully threaded upon the screw threads.

Fig. 2 is a fragmentary side elevation of the gauge shown in Fig. 1 with the gauge in its initial thread engaging position, and Fig. 3 is a fragmentary face view of a portion of the gauge.

In the above mentioned drawing there has been shown but one embodiment of the invention which is now deemed preferable but it is to be understood that changes and modifications may be made within the scope of the appended claims without departing from the spirit of the invention.

Briefly and in its preferred aspect, the invention may include the following principal parts: First, a body member or housing in the form of an annular member having a tubular handle extending centrally and axially from one face thereof; second, spaced freely rotatable screw thread engaging members secured in a circular series within the body member having annular ridges thereon spaced axially and corresponding to a multiple of the pitch of the screw threads being gauged; third, a plane surfaced disc or plate slidable axially within the housing and normally pressed toward its outermost position so that it will be in a position to engage against the end face of the member whose screw threads are being gauged; and fourth, a ring surrounding the housing and frictionally held in position thereon and adapted to be manually rotated.

Referring more in detail to the figures of the drawing, I provide a housing comprising in the form illustrated circular members 10 and 11. These members 10 and 11 are adapted to be secured together by means of tie bolts 12 which bolts may also support thereon rollers 13 provided with spaced ridges 14 adapted to contact with some of the screw threads of the threaded member being gauged. As the form of roller is generally similar to those shown in the patent to C. G. Johnson 1,660,335 granted February 28, 1928 further description of these members and their operation during the gauging of a screw thread is not thought to be necessary. It may be stated, however, that the rollers 13 are disposed between the end walls of member 11 in such a manner that they are retained against axial movements but are free to rotate. Also the grooved rollers 13 are shown of slightly tapered or conical form adapting them for proper engagement with the usual form of tapered pipe screw threads commonly used upon pipes and other tubular members.

Preferably a plurality of these grooved rollers are disposed in a circular series circumferentially about and within the periphery of the member 11 so that a threaded member W when being gauged will be contacted at a plurality of different points by different similar rollers.

In starting a thread gauge on this type over a threaded member being gauged of relatively large size, it is difficult to prevent the rollers 13 becoming cross threaded and to prevent such an occurrence and to properly engage these members upon the threads provision is made for resting the gauge against the face of a plate movably mounted axially within the gauge. In order to slidably mount this plate 15 it is provided with a central axial extension 16 extending within a hollow extension 17 forming a handle to the gauge. This handle member 17 may preferably be threaded or otherwise secured to plate 10. With the plate 15 resting against the end of the member W being gauged, the gauge is pushed toward the threaded member W against the pressure of a light spring 18 housed within the handle so that the rollers 15 can simultaneously engage the screw threaded surface.

The adjacent surfaces of plates 10 and 11 at their outer periphery are beveled as shown in Fig. 1 and these members are surrounded by a ring 20 loosely surrounding them. Mounted in the ring at spaced portions are screws 21 radially disposed and forcing inwardly resilient pads 22 of hard rubber or leather, etc., against the beveled faces of plates 10 and 11. By provision of these means the ring 20 is retained in position upon the plates 10 and 11 and retained against free rotation. Short handle members 23 may be provided in the ring 20 at spaced points adapted to be grasped by the user in rotating the gauge upon the work so that a normal frictional engagement of the grooved rollers 13 upon the screw threads being gauged will be assured in each gauging operation and an equal pressure employed on each specimen gauged.

To determine variation in sizes of threaded members there may be a zero mark 24 provided on the handle member 17 adjacent an opening 25 therethrough. On opposite sides of zero mark 24 there may be provided several spaced graduations. On the extension 16 at a portion visible when the gauge is in operative position is an annular mark 26. To retain the parts of the gauge against separation a transverse pin 27 may be pressed into the handle portion 17 and enter an annular recess portion adapted therefor in the extension 16 secured to the plate member 15.

What I claim is:

1. A screw thread gauge comprising in combination, a housing, a plurality of screw thread engaging members mounted in a circular series within said housing, a plate supported for movement within said housing in a direction parallel to said members, whereby a threaded member to be gauged may engage against a face of said plate and said thread engaging members when said gauge is placed in gauging position, means normally forcing said plate toward its forward position, and a ring surrounding said housing and frictionally retained for rotation thereon.

2. A screw thread gauge comprising in combination, a housing, a plurality of screw thread engaging members mounted in a circular series within said housing, a plate supported for movement within said housing in a direction parallel to said members, whereby a threaded member to be gauged may engage against a face of said plate and said thread engaging members when said gauge is placed in gauging position, and means normally forcing said plate toward its forward position, a tubular handle on said housing, a projection on said plate extending within said handle, and means on said handle and projection whereby variations in the members being gauged may be determined.

STANLEY G. JOHNSON.